(12) United States Patent
Dobmeier

(10) Patent No.: US 6,594,940 B1
(45) Date of Patent: Jul. 22, 2003

(54) FISHING HOOKING DEVICE

(76) Inventor: John Dobmeier, 2521 Lincoln St., Apt. 104, Hollywood, FL (US) 33020

( * ) Notice: Subject to any disclaimer, the term of this patent is extended or adjusted under 35 U.S.C. 154(b) by 0 days.

(21) Appl. No.: 10/174,645

(22) Filed: Jun. 18, 2002

(51) Int. Cl.$^7$ .............................................. A01K 97/12
(52) U.S. Cl. .............................................. 43/15; 43/16
(58) Field of Search ........................................ 43/15, 16

(56) References Cited

U.S. PATENT DOCUMENTS

| | | |
|---|---|---|
| 693,071 A | 2/1902 | Ruud |
| 2,551,996 A | 5/1951 | Cherubini |
| 2,689,426 A * | 9/1954 | Baenen ............................ 43/15 |
| 2,744,351 A | 5/1956 | Smith |
| 2,804,277 A | 8/1957 | Kinder |
| 2,843,962 A * | 7/1958 | Porter ............................ 43/15 |
| 2,918,746 A | 12/1959 | Hamrick |
| 2,964,868 A | 12/1960 | Bennett |
| 3,055,136 A * | 9/1962 | Scott et al. ...................... 43/15 |
| 3,154,875 A * | 11/1964 | Biddison ........................ 43/15 |
| 3,881,269 A | 5/1975 | Timmons |
| 4,231,178 A | 11/1980 | Black |
| 4,235,035 A | 11/1980 | Guthrie |
| 4,476,645 A * | 10/1984 | Paarmann ...................... 43/15 |
| 4,676,018 A | 6/1987 | Kimball |
| 4,730,408 A | 3/1988 | Miller |
| 5,050,332 A | 9/1991 | Cross |
| 5,050,333 A * | 9/1991 | Debreczeni ...................... 43/17 |
| 5,070,638 A | 12/1991 | Tregaskis |
| 5,076,001 A | 12/1991 | Coon et al. |
| 5,245,778 A | 9/1993 | Gallegos et al. |
| 5,279,064 A | 1/1994 | Jaeger |
| 5,359,802 A | 11/1994 | Gutierrez |
| 5,383,298 A | 1/1995 | Engel |
| 5,524,376 A * | 6/1996 | Flisak ............................ 43/15 |
| 5,930,938 A | 8/1999 | De Fraties et al. |
| 6,088,946 A | 7/2000 | Simmons |

FOREIGN PATENT DOCUMENTS

| | | | | |
|---|---|---|---|---|
| EP | 497998 A1 * | 8/1992 | .......... | A01K/91/10 |
| GB | 2179531 A * | 3/1987 | .......... | A01K/97/10 |

* cited by examiner

*Primary Examiner*—Peter M Poon
*Assistant Examiner*—Joan M. Olszewski
(74) *Attorney, Agent, or Firm*—Laurence A. Greenberg; Werner H. Stemer; Gregory L. Mayback

(57) ABSTRACT

A fish hooking device includes a fishing rod holder pivotably mounted such that the fishing rod holder is pivotable about a first pivot axis and pivotable about a second pivot axis substantially parallel to the first pivot axis. The fishing rod holder has a cocked position and a released position. The fishing rod holder pivots about the first pivot axis when moving between the cocked position and the released position. A trigger device is connected to the fishing rod holder. The trigger device is configured to hold the fishing rod holder in the cocked position. The fishing rod holder triggers the trigger device when pivoting about the second pivot axis. The trigger device allows the fishing rod holder to move from the cocked position into the released position when being triggered.

6 Claims, 4 Drawing Sheets

FISHING HOOKING DEVICE

BACKGROUND OF THE INVENTION

Field of the Invention

The invention relates to a fish hooking device which is triggered in response to a fishing line being pulled.

U.S. Pat. No. 3,881,269 discloses a fish hooking device for automatically setting the hook in a fish after the fish takes the bait. The fish hooking device includes a base, a receiving tube for receiving a fishing rod, an adjustable spring mount, and a trigger mount. A spring is connected between the receiving tube and the adjustable spring mount. The trigger mount is configured to connect the receiving tube so as to hold the receiving tube in a "cocked" position against the tension of the spring. When a fish takes the bait with a force sufficient to move the fishing rod and the receiving tube forward against the spring, the trigger mount will disengage. When the trigger mount is disengaged, the spring tension acts on the receiving tube in a backward direction so as to cause the fishing rod to be pulled backward against the pull of the fish, thereby setting the hook in the fish.

A disadvantage of the fish hooking device disclosed in U.S. Pat. No. 3,881,269 is that the spring connected between the receiving tube and the adjustable spring mount must have a rather small spring constant because the fish must be able to trigger the fish hooking device by pulling against the spring force. The small spring constant of the spring means that the force that pulls the fishing rod in the backward direction is rather small and may be even be too small to set the hook in the fish.

U.S. Pat. No. 5,050,332 discloses a fish hooking device with a fishing rod holder that is hinged mounted on a top side of a base support member. A trigger mechanism is provided to release the cocked fishing rod holder so that the fishing rod holder may swing upwardly in order to hook the fish. The coil spring may be adjusted to control the force acting to rotate the fishing rod upwardly and to control the force required to release the trigger.

The fish hooking device disclosed in U.S. Pat. No. 5,050,332 has the disadvantage that the coil spring must have a small spring constant because the fish triggers the fish hooking device by pulling against the force of the coil spring. The small spring constant results in a small pulling force for pulling the fishing rod upwardly.

U.S. Pat. No. 4,231,178 discloses fish hooking device which supports a fishing rod and is triggered in response to a fish jerking on the fishing line. The fish hooking device includes a support member which pivotally carries on its end portion a second member which supports a rod holder. A spring biases the second member in a predetermined pivotal direction for setting the hook in the fish's mouth. A trigger which is mounted on the support member maintains the second member in a predetermined pivotal position by counteracting the forces applied to the second member by the spring. The trigger releases the second member responsive to a fish jerking on the fishing rod such that the tension spring assembly thereby sets the hook in the fish's mouth. U.S. Pat. No. 4,231,178 also has the disadvantage, that the force required to trigger the fish hooking device and the force for setting the hook is substantially equal because these forces are generated by the same spring.

U.S. Pat. No. 2,964,868 discloses a fish hooking device which is triggered in response to a tug or pull on the fishing line. The fishing line is looped around a pivotable latch element. In response to a pull on the fishing line, the latch element pivots and triggers the fish hooking device such that the fish hooking device moves from a cocked position to a released position. A disadvantage of this fish hooking device is that the fishing line has to be looped around the latch element and around a further element prior to being ready for operation. Further fish hooking devices that operate by looping the fishing line around triggering elements of the fish hooking device are for example described in U.S. Pat. Nos. 2,804,277, 5,245,778, 2,744,351, 5,076,001, 2,918, 746, and 4,730,408. The operation of such fish hooking devices is generally complicated and the fishing line or the fishing rod may be damaged when these fish hooking devices are triggered because the fishing line does not run in its usual path along the fishing rod. In particular, a monofilament fishing line attached to the trigger mechanism may be damaged as a result of the triggering operation. A further disadvantage of these fishing-line triggered devices is that the looping of the fishing line results in a slack in the fishing line immediately after the triggering. This slack in the fishing line may have the result that the fishing line gets tangled upon triggering the fish hooking device.

SUMMARY OF THE INVENTION

It is accordingly an object of the invention to provide a fish hooking device which overcomes the above-mentioned disadvantages of the heretofore-known fish hooking devices of this general type and which can provide a sufficient force for pulling in the fishing rod and which provides a reliable and simple operation.

With the foregoing and other objects in view there is provided, in accordance with the invention, a fish hooking device, including:

- a fishing rod holder pivotably mounted such that the fishing rod holder is pivotable about a first pivot axis and pivotable about a second pivot axis substantially parallel to the first pivot axis;
- the fishing rod holder having a cocked position and a released position, the fishing rod holder pivoting about the first pivot axis when moving between the cocked position and the released position;
- a trigger device connected to the fishing rod holder, the trigger device being configured to hold the fishing rod holder in the cocked position;
- the fishing rod holder triggering the trigger device when pivoting about the second pivot axis, the trigger device allowing the fishing rod holder to move from the cocked position into the released position when being triggered; and
- an elastic element connected to the fishing rod holder, the elastic element moving the fishing rod holder from the cocked position to the released position, when the trigger device is triggered.

In accordance with another feature of the invention, the elastic element exerts a first force on the fishing rod holder when the fishing rod holder is in the cocked position; and the fishing rod holder pivots about the second pivot axis when a second force, which is smaller than the first force, is exerted on the fishing rod holder. The force for pulling in the fishing rod can advantageously be set to be much greater than the force required for triggering the fish hooking device.

In accordance with yet another feature of the invention, a first end of a hinged plate is hinged connected to a base plate at the first pivot axis; and the fishing rod holder is pivotably mounted to the hinged plate at the second pivot axis.

In accordance with a further feature of the invention, the trigger device includes a first hook attached to the base plate and a second hook attached to the hinged plate; the first hook and the second hook engage one another when the fishing rod holder is in the cocked position; and the first hook and the second hook are disengaged from one another when the trigger device is triggered.

In accordance with yet a further feature of the invention, the trigger device includes a cable having a first cable end attached to the hinged plate and a second cable end attached to the second hook; and at least one cable guide is disposed on the fishing rod holder, the cable is guided by the at least one cable guide.

In accordance with a further feature of the invention, the at least one cable guide is at least one pulley and/or at least one eyelet.

In accordance with another feature of the invention, the fishing rod holder is a tubular device.

In accordance with yet another feature of the invention, the elastic element is a coil spring.

In accordance with yet another feature of the invention,
- a first support (hinged plate) is provided and the fishing rod holder is pivotably mounted on the first support;
- a second support (base plate) is provided;
- a hinge configuration connects the first support to the second support such that the first support is pivotable with respect to the second support; and
- the hinge configuration includes the elastic element such that the hinge configuration exerts a force on the first support and on the second support for moving the fishing rod holder from the cocked position to the released position.

With the objects of the invention in view there is also provided, a fish hooking device, including:
- a fishing rod holder pivotably mounted such that the fishing rod holder is pivotable about a first pivot axis and pivotable about a second pivot axis substantially parallel to the first pivot axis;
- the fishing rod holder having a cocked position and a released position, the fishing rod holder pivoting about the first pivot axis when moving between the cocked position and the released position;
- means for triggering connected to the fishing rod holder, the means for triggering being configured to hold the fishing rod holder in the cocked position;
- the fishing rod holder triggering the means for triggering when pivoting about the second pivot axis, the means for triggering allowing the fishing rod holder to move from the cocked position into the released position when being triggered; and
- an elastic element connected to the fishing rod holder, the elastic element forcing the fishing rod holder from the cocked position to the released position, when the means for triggering is triggered.

Other features which are considered as characteristic for the invention are set forth in the appended claims.

Although the invention is illustrated and described herein as embodied in a fish hooking device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
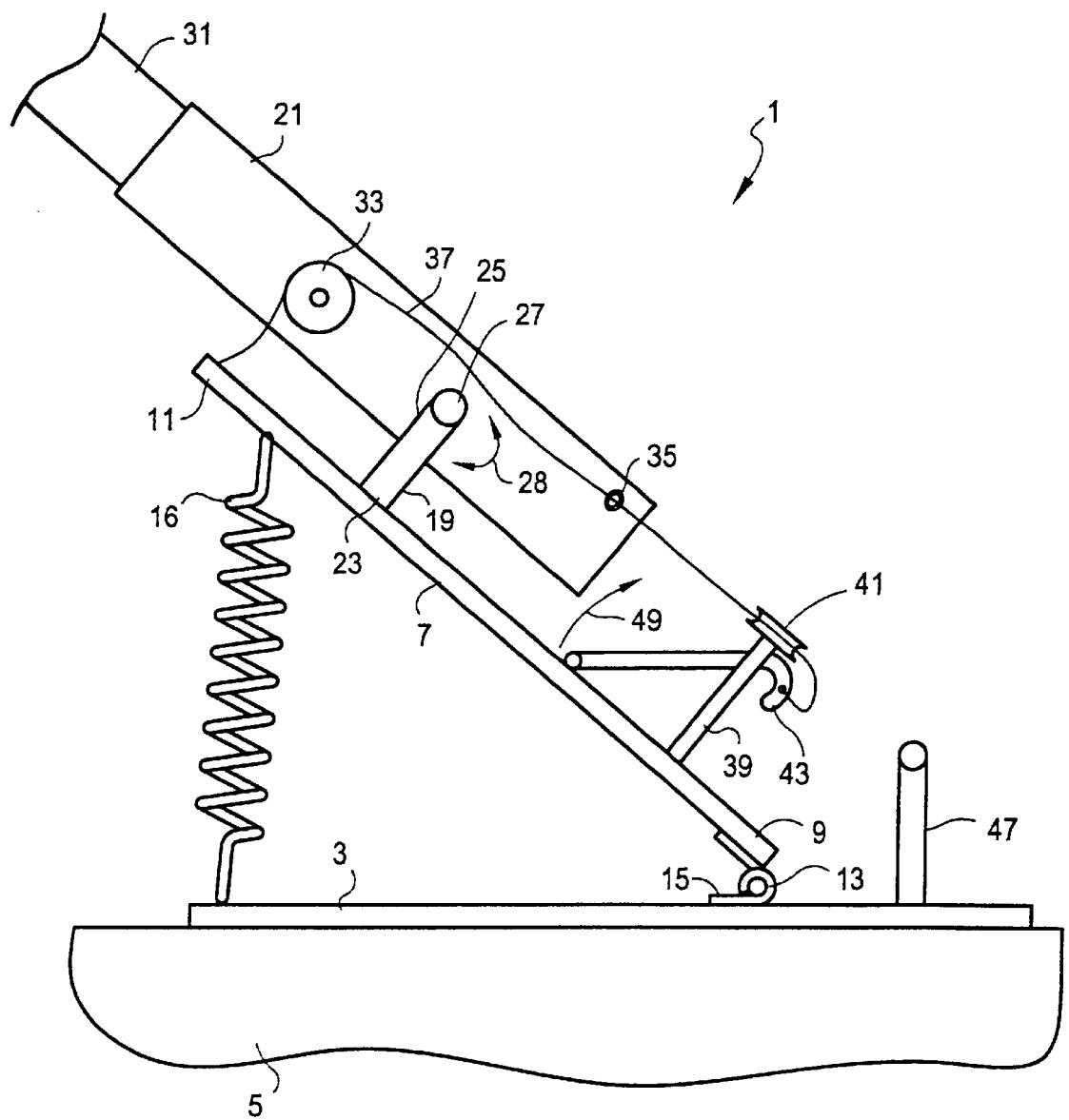
FIG. 1 is a diagrammatic side elevational view of an exemplary embodiment of a fish hooking device according to the invention in a released position.

Referring now to the figures of the drawings in detail and first, particularly, to FIG. 1 thereof, there is shown a fish hooking device 1 according to the invention. The fish hooking device 1 includes base plate 3 which can be used to mount the fish hooking device 1 to a support 5. The base plate 3 may be attached to the support 5 by using a clamping connection, a screwed connection, a latched connection or any other type of connection.

A hinged plate 7 has a first end 9 and a second end 11. The first end 9 of the hinged plate 7 is attached to the base plate 3 at a first pivot axis 13. The first pivot axis 13 is embodied as a hinge 15 connected to the base plate 3 and to the hinged plate 7. FIG. 1 shows the fish hooking device 1 in a released position. The pivoting movement of the hinged plate 7 is preferably stopped at an appropriate position when the hinged plate moves into the released position. A coil spring 16 is attached with one end to the base plate 3 and with the other end to the hinged plate 7. The coil spring 16 has a spring constant such that the hinged plate 7 is forcefully pulled from the cocked position to the released position such that the fishing hook is reliably set in a fish after the fish takes the bait.

Two support arms 19 are attached at their bottom ends 23 to the hinged plate 7 in order to hold the fishing rod holder 21. The top ends 25 of the support arms 19 provide a second pivot axis 27 around which the fishing rod holder 21 can pivot in a see-saw movement indicated by arrow 28. The pivoting movement of the fishing rod holder 21 about the second pivot axis 27 is preferably limited to an appropriate pivoting range. The fishing rod holder 21 is a tube into which a fishing rod 31 can be inserted.

A pulley 33 is attached at the upper portion of the fishing rod holder 21. An eye loop 35 is attached to the lower portion of the fishing rod holder 21. A cable 37 is attached at the second end 11 of the hinged plate 7 and is guided around the pulley 33 and through the eye loop 35. Of course the pulley 33 may be replaced with an eye loop or some other cable guiding mechanism that performs the intended function of guiding the cable 37.

A stem 39 is mounted on the hinged plate 7. A pulley wheel 41 is attached to the top of the stem 39. Of course the pulley wheel 41 may be replaced with an eye loop or some other cable guiding mechanism that performs the intended function of guiding the cable 37. A first hook 43 is movably attached to the hinged plate 7. The cable 37 is guided around the pulley wheel 41 and is connected to the first hook 43. A second hook 47 is fixedly attached to the base plate 3. The first hook 43 is preferably a U-shaped hook and the second hook 47 is preferably an L-shaped hook. The first hook 43 and the second hook 47 are configured such that they engage one another when the fish hooking device 1 is in the cocked position.

Figure 2:
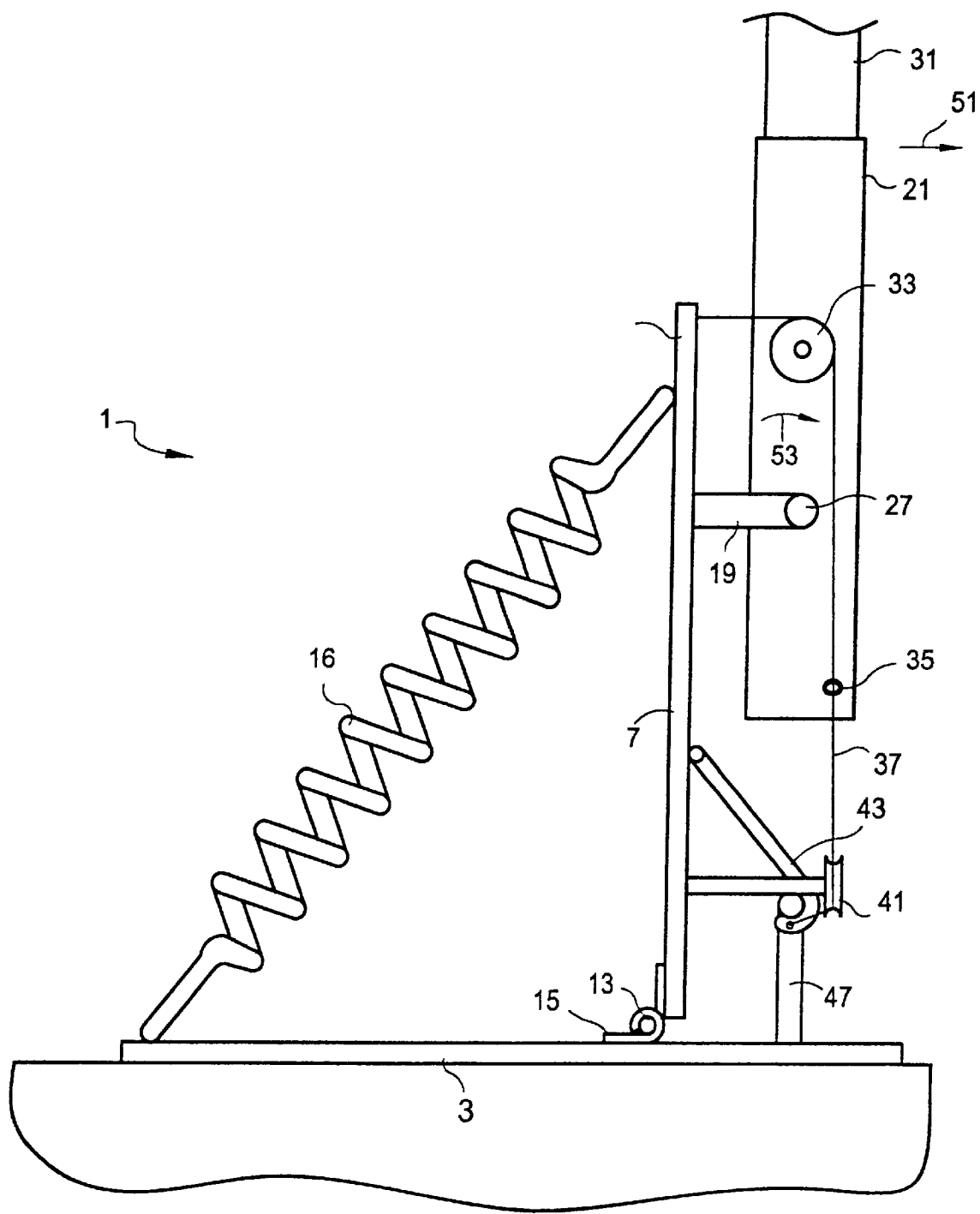
FIG. 2 is a diagrammatic side elevational view of the exemplary embodiment of the fish hooking device according to the invention in a cocked position.

FIG. 2 is a diagrammatic side elevational view of the fish hooking device according to the invention in a cocked position. The hinged plate 7 extends substantially vertically when the fish hooking device 1 is in the cocked position. The coil spring 16 is stretched and provides a biasing force that pulls on the second end 11 of hinged plate 7.

The fishing rod holder 21 is held in a given position when the fish hooking device 1 is in the cocked position. The cable 37 which is attached at the second end 11 of the hinged plate 7 and which is guided around the pulley 33 and through the eye loop 35 is pulled tightly around the pulley 33 and the pulley wheel 41 when the fish hooking device 1 is in the cocked position. The first hook 43 and the second hook 47 engage one another in a hooking connection.

Figure 3:
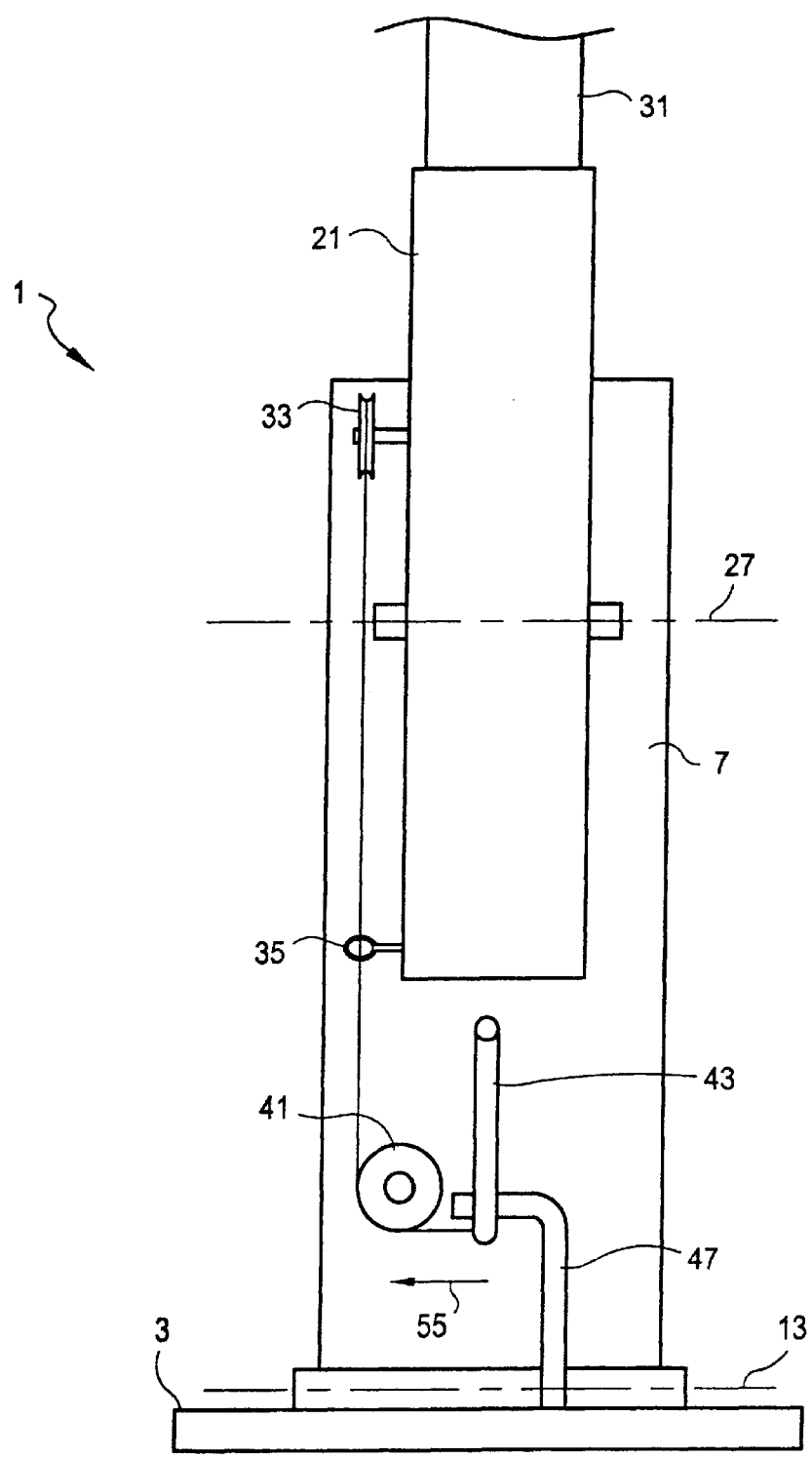
FIG. 3 is a diagrammatic front view of the exemplary embodiment of the fish hooking device according to the invention in a cocked position.

FIG. 3 is a diagrammatic front view of the fish hooking device according to the invention in a cocked position. As can be seen, the first hook 43 and the second hook 47 are hooked into one another and form part of a triggering device for triggering the fish hooking device 1.

Figure 4:
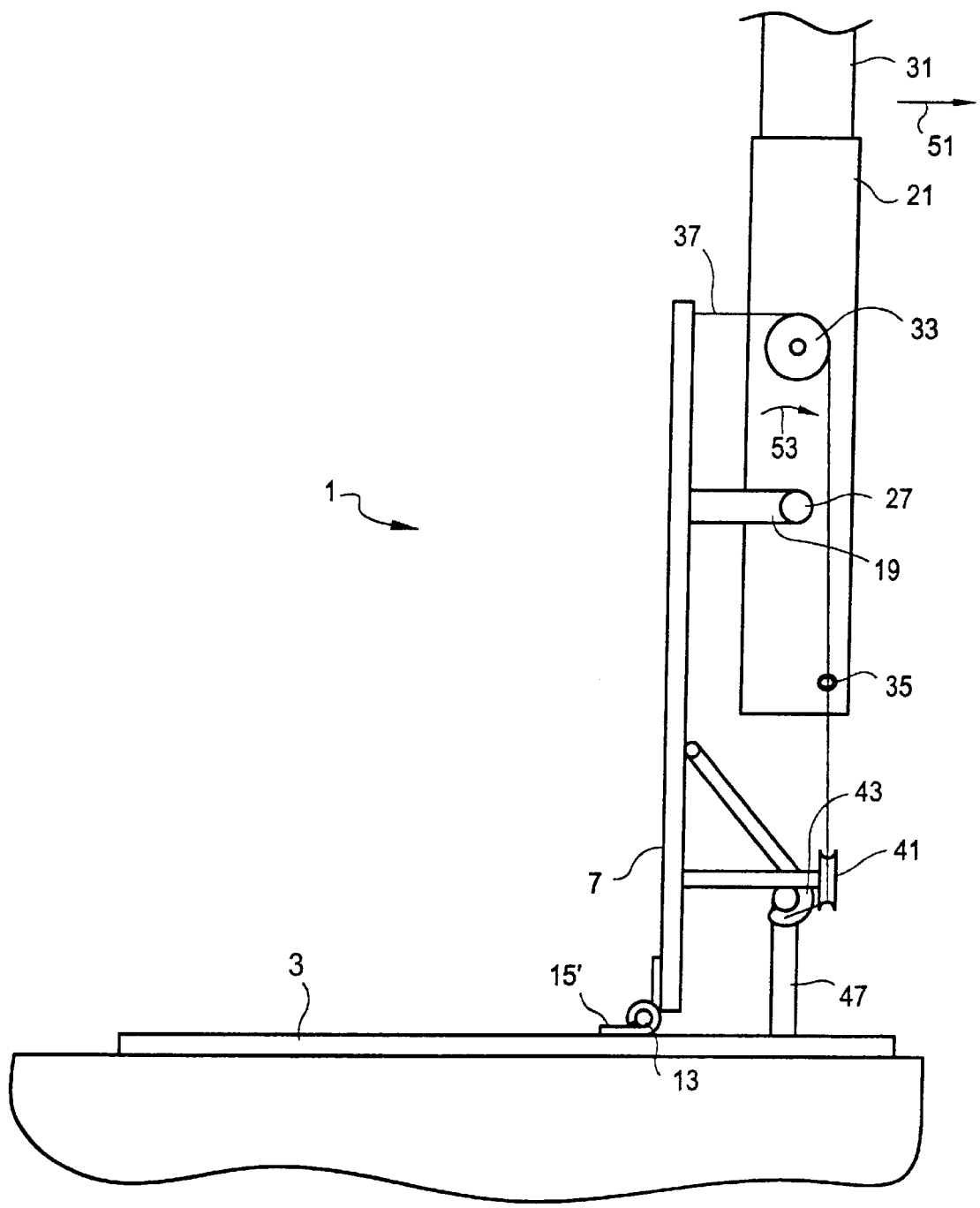
FIG. 4 is a diagrammatic side elevational view of an exemplary embodiment of a fish hooking device using a spring loaded hinge.

FIG. 4 is a diagrammatic side elevational view of an exemplary embodiment of a fish hooking device 1 that uses a spring loaded hinge 15' rather than a combination of a regular hinge 15 and a coil spring 16 as shown in FIG. 1. The spring loaded hinge 15' is fastened to the base plate 3 and to the hinged plate 7 such that the hinged plate 7 is pivotable with respect to the base plate 3. The spring loaded hinge 15' exerts a force on the hinged plate 7 and on the base plate 3 for moving the fishing rod holder from the cocked position to the released position.

The operation of the fish hooking device 1 is explained in the following. Starting with the fish hooking device 1 in the released position as shown in FIG. 1, the hinged plate 7 is moved clockwise in a direction of arrow 49 in order to bring the hinged plate 7 in a substantially vertical position. The first hook 43 is then hooked onto the second hook 47, as is seen in FIGS. 2 and 3. The fishing rod 31 is inserted into the fishing rod holder 21 after moving the hinged plate into the vertical position.

When a fish pulls on the fishing line in a direction indicated by arrow 51 in FIG. 2, then the fishing rod holder is rotated in a direction of arrow 53 about the second pivot axis 27. When the fishing rod holder rotates about the second pivot axis 27, the cable 37 pulls the first hook 43 in a direction of arrow 55. The first hook 43 is pulled off the second hook 47 which triggers the fish hooking device 1. The hinged plate 7 is no longer held in the vertical position and the coils spring 16 pulls the hinged plate 7 into the released position thus setting the fishing hook in the fish. The fish hooking device according to the invention allows a combination of relatively smaller triggering forces in combination with relatively larger "pulling-in" forces without requiring that the fishing line is looped around any element of a triggering device.

The invention has been described in an exemplary manner and a person of skill in the art will readily change the fish hooking device 1 according to the invention in order to optimize the operation of the fish hooking device 1. The cocked position of the fishing rod holder may for example be changed to a position other than the vertical position shown in FIG. 2. Also, the triggering device may be altered to perform the same function as the function performed by the first and second hooks 43 and 47.

I claim:

1. A fish hooking device, comprising:
a fishing rod holder pivotably mounted such that said fishing rod holder is pivotable about a first pivot axis and pivotable about a second pivot axis substantially parallel to the first pivot axis;

said fishing rod holder having a cocked position and a released position, said fishing rod holder pivoting about the first pivot axis when moving between the cocked position and the released position;

a trigger device connected to said fishing rod holder, said trigger device being configured to hold said fishing rod holder in the cocked position;

said fishing rod holder triggering said trigger device when pivoting about the second pivot axis, said trigger device allowing said fishing rod holder to move from the cocked position into the released position when being triggered;

an elastic element connected to said fishing rod holder, said elastic element moving said fishing rod holder from the cocked position to the released position, when said trigger device is triggered;

a base plate;

a hinged plate having a first end and a second end;

said first end of said hinged plate being hinged connected to said base plate at the first pivot axis;

said fishing rod holder being pivotably mounted to said hinged plate at the second pivot axis;

said trigger device including a first hook attached to said base plate and a second hook attached to said hinged plate;

said first hook and said second hook engaging one another when said fishing rod holder is in the cocked position;

said first hook and said second hook being disengaged from one another when said trigger device is triggered;

said trigger device including a cable having a first cable end attached to said hinged plate and a second cable end attached to said second hook; and at least one cable guide disposed on said fishing rod holder, said cable being guided by said at least one cable guide.

2. The fish hooking device according to claim 1, wherein:
said elastic element exerts a first force on said fishing rod holder when said fishing rod holder is in the cocked position; and said fishing rod holder is pivoted about the second pivot axis when a second force smaller than the first force is exerted on said fishing rod holder.

3. The fish hooking device according to claim 1, wherein said at least one cable guide is an element selected from the group consisting of a pulley and an eyelet.

4. The fish hooking device according to claim 1, wherein said fishing rod holder is a tubular device.

5. The fish hooking device according to claim 1, wherein said elastic element is a coil spring.

6. The fish hooking device according to claim 1, including:
a hinge configuration connecting said hinged plate to said base plate such that said hinged plate is pivotable with respect to said base plate; and said hinge configuration including said elastic element such that said hinge configuration exerts a force on said hinged plate and on said base plate for moving said fishing rod holder from the cocked position to the released position.

* * * * *